July 19, 1927.

F. R. SIMMS

FLEXIBLE ROTARY COUPLING

Filed Feb. 5, 1926

1,636,389

INVENTOR
Frederick Richard Simms.
By Edward Williams
His Attorney.

Patented July 19, 1927.

1,636,389

UNITED STATES PATENT OFFICE.

FREDERICK RICHARD SIMMS, OF LONDON, ENGLAND.

FLEXIBLE ROTARY COUPLING.

Application filed February 5, 1926, Serial No. 86,351, and in Great Britain November 16, 1925.

My invention relates to flexible rotary couplings, and more particularly to flexible couplings for end-to-end or substantially collinear shafts, such as Cardan shafts.

The primary object of my invention is to provide an improved flexible coupling which will allow a considerable amount of power to be transmitted for a given size of coupling.

A further object of my invention is to provide means whereby a flexible coupling including a disc or annular resilient member will be capable of transmitting a greater torque without its size being appreciably increased.

Further objects and advantages will appear from the following description when read in conjunction with the accompanying drawings, and the scope of the invention will be pointed out with particularity in the appended claims. In the accompanying drawings:

Figure 1:
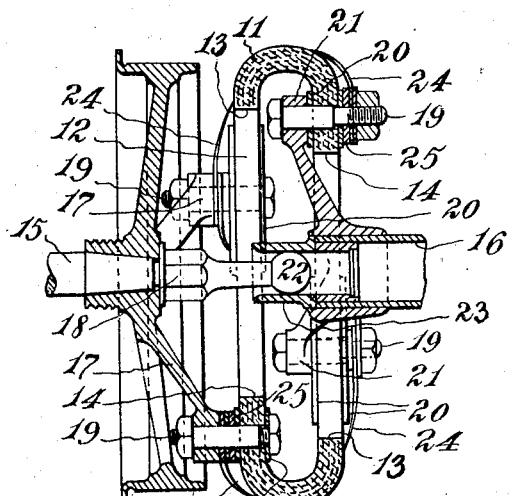
Fig. 1 is a sectional side elevation of a flexible coupling connecting substantially-collinear shafts in accordance with an embodiment of my invention.

Referring now to the accompanying drawings, the resilient member 11 of the coupling is here shown as a U-shaped resilient annulus, formed preferably of rubber or of canvas reinforced with rubber, and the inner peripheries 12 of the two arms of the U are triangularly shaped, the apices 13 of the triangular opening of one arm lying opposite the sides 14 of the triangular opening of the other arm.

This resilient annulus constitutes the subject matter of a co-pending application Serial No. 43,994, filed by me July 16, 1925, and entitled "Resilient shaft coupling."

The shafts 15 and 16 are here shown as being connected externally and internally, respectively, to the resilient member 11. Shaft 15 carries a spider 17 secured thereto by the nut 18, and the ends of alternate arms of the spider are clamped externally to one of the arms of the resilient member 11 adjacent the triangular sides 14 thereof, by the nuts and bolts 19.

In like manner the shaft 16 which is shown hollow carries the spider 21 fixedly secured thereon, the ends of the arms of the spider being clamped against the inside of one of the arms of the resilient member 11, adjacent the triangular sides 14 thereof, by means of the bolts and nuts 19.

Reinforcing plates 20 of iron or the like are riveted or otherwise secured to the resilient device 11 adjacent the sides 14, the same having bolt-holes to receive the bolts 19.

Means for rigidly centering the shafts 15 and 16 with respect to one another, and for allowing of relative longitudinal and rotative movement, are preferably provided. Such means may consist of (as shown in Fig. 1) a ball device 22 formed on an extension of the nut 18 and arranged to be relatively slidable longitudinally and rotatable within a cooperating hollow cylindrical member 23 which may be fixed into the hollow shaft 16.

Figure 2:
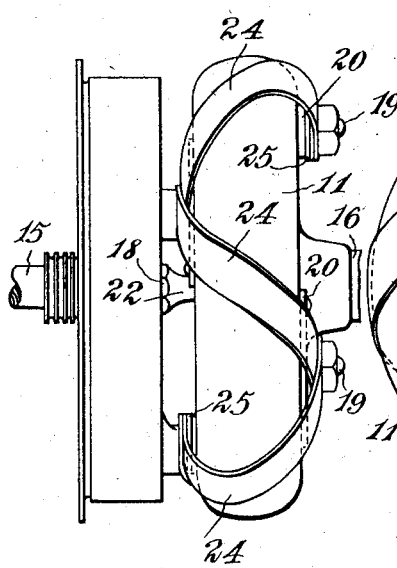
Fig. 2 is a side view of the resilient device of the coupling shown in Fig. 1.
Figure 3:
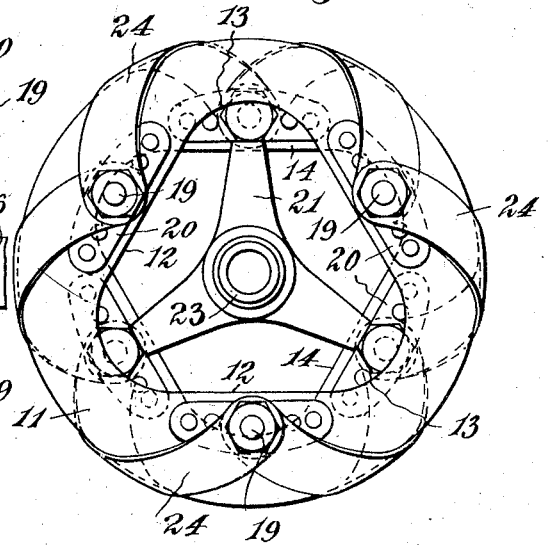
Fig. 3 is an end view thereof taken from the left, one of the shafts and its associated parts being omitted.
Figure 4:
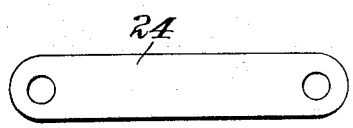
Fig. 4 is a view of one of the torque-transmitting strips used in accordance with this embodiment before the same has been bent into shape.

In order to increase the torque-transmitting capability of this flexible coupling, in accordance with my invention a plurality of strips or bands or the equivalent are secured to the two shafts and arranged to pass adjacent one of the surfaces of the resilient member 11 so that they can be easily assembled. Preferably said strips are supported by the resilient device, which acts to prevent the same from collapsing when transmitting torque. Said strips are strong enough to transmit the necessary torque and at the same time sufficiently resilient as not to reduce unfavourably the flexibility of the coupling. In the accompanying drawings the strips 24 are each formed from a plain flat strip, shown in Fig. 4, which is bent on a suitable former into substantially semi-helical form, as indicated in Figs. 2 and 3. The strips 24 are here shown as being arranged against the outside surface of the resilient member 11, and the strips are conveniently secured to the shafts by means of the bolts and nuts 19, a washer 25 being provided for spacing the strips from the reinforcing plates 20.

By arranging the strips 24 to pass diagonally or helically across the periphery of the resilient device 11, I find that the strips when transmitting torque are subjected mainly to tensile stresses.

The embodiment of my invention illustrated and described herein has been selected for the purpose of clearly setting forth the principles involved. It will be apparent that my invention is not limited to flexible couplings employing a hollow annular resilient member as is herein described in detail; nor is it limited to the use of torque-transmitting strips passing against the outside surface of an annular resilient member from a connection on one side thereof to the next connection on the other side thereof. My invention is in fact susceptible of being modified to meet the different conditions encountered in its use, and I therefore wish to cover by the appended claims all modifications within the true spirit and scope of my invention.

What I claim as new and desire to secure by Letters Patent of the United States is:

1. A flexible shaft-coupling for two substantially collinear shafts comprising a resilient device of U-shaped cross section connected on each side to one of said shafts and additional torque-transmitting means secured to said shafts and resting against the surface of said resilient device, said torque-transmitting means being bowed outwardly and adapted so as not to reduce unfavourably the flexibility of the coupling.

2. In a flexible shaft-coupling, the combination of a driving member, a driven member, a resilient device of U-shaped cross section connected to said driving and driven members, and springy torque-transmitting means clamped to said driving and driven members, and lying substantially helically against the outer surface of said resilient device.

3. A flexible shaft-coupling for two substantially collinear shafts comprising a fabricated resilient device, a connection between one of said shafts and one side of said device, a connection between the other of said shafts and the other side of said device, and a band of springy torque-transmitting material clamped to said connections, said band lying adjacent the surface and passing outwardly and around from one side to the other side of said resilient device.

4. A flexible shaft-coupling comprising a resilient device having an annular outer periphery, a pair of substantially collinear shafts connected on opposite sides thereof at a plurality of places, said places on one side being intermediate the places on the other side, and a torque-transmitting steel strip passing outside the periphery of said resilient device from one of said places on one side to one of the intermediate places on said other side.

5. A flexible shaft-coupling for two substantially collinear shafts comprising an annular resilient member, a plurality of connections between one side of said member and one of said shafts, a plurality of connections between the other side of said member and the other of said shafts, said connections on one side lying intermediate said connections on the other side, and a plurality of torque-transmitting steel strips passing outside of said resilient member from the connections on one side thereof, respectively, to the nearest connections on the other side thereof.

6. An annular resilient member for a flexible shaft-coupling of U-shaped cross section with the arms of the U turned radially inwards, comprising bolt-holes arranged circumferentially alternately in opposite arms of the U, the inner edges of said arms being cut away opposite said bolt-holes in said other arm, bolts in said bolt-holes for the attachment of driving and driven members, and a plurality of spring steel bands connecting each bolt with the two nearest bolts on the other arm of said resilient member.

7. A flexible coupling comprising a resilient device having an annular outer periphery, a pair of substantially collinear shafts, means connecting said shafts on opposite sides of said resilient device at a plurality of places, said places on one side being intermediate the places on the other side, a torque-transmitting steel strip passing outside the periphery of said resilient device from one of said places on one side to the next place on said other side, and centering means for the shafts comprising means formed on an extension of one shaft slidably cooperating with means formed on an extension of the other shaft.

In witness whereof, I have hereunto set my hand this twentieth day of January, 1926.

FREDERICK RICHARD SIMMS.